May 6, 1958 L. P. SPONTELLI 2,833,156
BALL SCREW
Filed Aug. 23, 1954 2 Sheets-Sheet 1

INVENTOR.
LEONARD P. SPONTELLI
BY
ATTORNEY

United States Patent Office 2,833,156
Patented May 6, 1958

2,833,156
BALL SCREW

Leonard P. Spontelli, Cleveland, Ohio, assignor to The Cleveland Pneumatic Tool Company, Cleveland, Ohio, a corporation of Ohio Application August 23, 1954, Serial No. 451,333

9 Claims. (Cl. 74—459)

This invention relates to screw devices and more particularly to an antifriction ball screw mechanism.

In the conventional ball screw mechanism helical grooves are formed on the screw which cooperate with helical grooves formed in the nut to form a ball passage. Balls are located in the ball passage interengaging the nut and the screw in such a manner that the balls provide frictionless rolling as the screw is rotated relative to the nut. The relative rotation of the screw and nut causes the balls to progress, due to this rolling operation, along the groove of the nut and it is therefore necessary to provide return means for returning balls from one end of the nut to the other so that a closed circuit of balls is provided.

Prior art devices have utilized return tubes which are mounted on the outside of the nut and are arranged to receive and deliver balls to the ball passage thereby forming this closed circuit. Difficulty has occurred in fitting these return tubes to the nut since the tolerances must necessarily be extremely small to insure the proper rolling. This invention contemplates a ball screw mechanism wherein the necessity of the return tube is eliminated and wherein the return pass for the balls is formed in the nut and screw in the same manner as the initial or load pass. The structure, according to this invention, therefore eliminates the difficulty of fitting the return tube on the nut and, for that matter, eliminates the return tube entirely thereby substantially reducing the manufacturing costs.

It is an important object of this invention to provide a ball screw mechanism wherein the return passage for conveying the balls from one end of the nut to the other is formed by cooperating helical grooves in the nut and the screw.

It is another object of this invention to provide a ball screw mechanism in which two similar passes of balls are provided in the nut and screw wherein at any given time one pass is utilized to carry the load and the other pass serves as a return pass to complete the closed circuit for the balls.

It is still another object of this invention to provide a ball screw mechanism wherein cooperating grooves are formed in the nut and screw which define two coaxial similar helical ball passages which are joined at their ends to provide a closed circuit for the balls.

Further objects and advantages will appear from the following description and drawings, wherein.

In a ball screw according to this invention, the screw is formed with helical grooves in the peripheral surface and the nut is formed with complementary helical grooves which cooperate with the grooves of the screw to define the ball passages of the mechanism. The grooves are formed so that two separate coaxial helical passages are defined thereby, to provide two passes of balls within the nut. The nut is also provided with means for connecting the ends of the helical passes and reversing the direction of ball movement.

Figure 1:
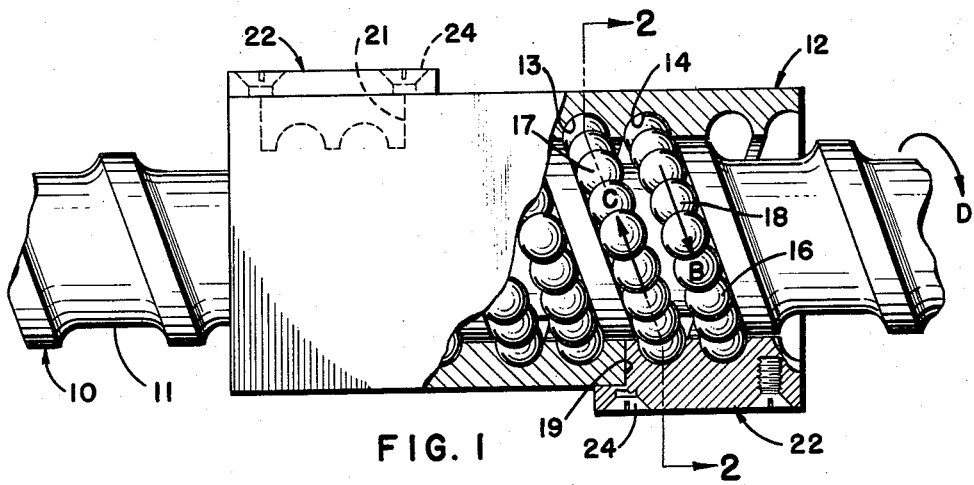
Figure 1 is a side elevation in partial longitudinal section showing a ball screw mechanism embodying this invention.

For a clear understanding of this invention, reference should be made to the drawings wherein a ball screw according to this invention is shown. In the embodiment of this invention shown in Figures 1 through 5, a screw 10 is provided with a relatively broad helical groove 11 and a nut 12 is formed with two coaxial similar helical grooves 13 and 14 which both extend through the entire length of the nut. The width of the groove 11 in the screw 10 is proportioned to be sufficient to encompass both of the grooves 13 and 14 and all three grooves are formed with the same lead. As a result, each of the grooves 13 and 14 in cooperation with the groove 11 define a helical ball pass adapted to receive balls 16. It should be understood that although antifriction ball bearings are shown, other forms of antifriction bearings could be utilized. As shown in Figure 1, the helical groove 13 in cooperation with the groove 11 defines a left ball pass 17 and the helical groove 14 in cooperation with the groove 11 defines a right ball pass 18.

Figure 3:
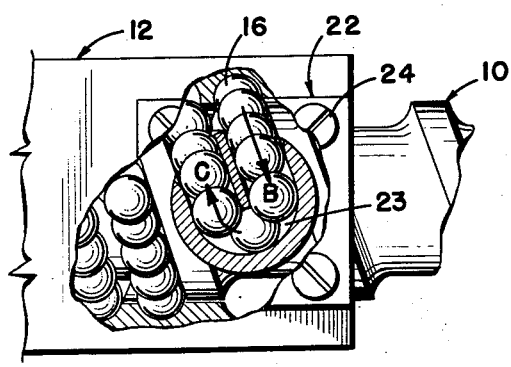
Figure 3 is a fragmentary view partially in longitudinal section showing the insert utilized to reverse the direction of ball movement.
Figure 2:
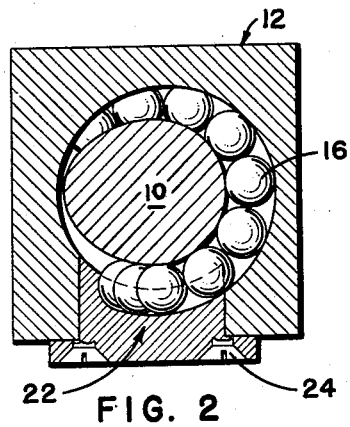
Figure 2 is a cross sectional view of the ball screw mechanism taken along 2—2 of Figure 1.
Figure 5:
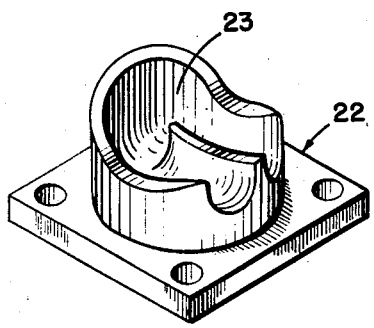
Figure 5 is a perspective view of the turn-around insert utilized to reverse the direction of ball movement.

The nut 12 is also formed with two axially spaced substantially radial openings 19 and 21 which have a diameter greater than the combined width of the two passes 17 and 18. An insert 22 is positioned in each of the openings 19 and 21 and is provided with a semicircular U-shaped groove 23 adapted to direct the flow of the balls through a turn of 180°. This groove 23 is best illustrated in Figures 3 and 5. The insert 22 is mounted on the nut 12 by screws 24 in such a manner that each end of the U-shaped groove 23 is aligned with one of the grooves 13 and 14 and the groove 23 is proportioned to turn the flow of balls through 180° within the width of the groove 11. By connecting the ends of the grooves 13 and 14 in this manner, a closed circulating circuit is formed for the balls 16.

Figure 4:
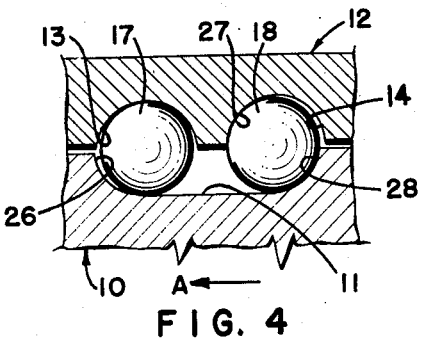
Figure 4 is an enlarged fragmentary cross section showing the relationship of the two passes of balls when a load is applied to the screw.

In operation, one of the passes 17 or 18 serves to transmit an axial load between the screw and the nut and the other of the passes serves as the return pass to return the balls between opposite ends of the nut. Reference should be made to Figure 4 for a clear understanding of the operation of this device. In Figure 4, the various elements are shown as they would be positioned when the axial load indicated by the arrow A is urging the screw 10 to the left relative to the nut 12. It should be noted that the groove 11 is formed with an axial extent which will provide the axial clearance 26 between the balls of the pass 17 and the groove when the screw is loaded as shown in Figure 4. The balls of the pass 18 engage a side portion 27 of the groove 14 and a side portion 28 of the groove 11 thereby transmitting the axial load from the screw 10 to the nut 12. Because clearance 26 is provided, the balls within the pass 17 are loosely positioned within the groove 13. As the screw 10 is rotated relative to the nut 12 in the direction indicated by the arrow D, the balls in the pass 18 provide a rolling engagement with the wall portions 27 and 28 which will cause the balls in the pass 18 to move in the direction of the arrow B. When the balls in the pass 18 reach the insert 22, they are turned through 180°. Since the balls within the pass 17 are free of any load and therefore capable of moving freely within the pass, these balls will move in the direction indicated by arrow C, which is opposite to the direction of the ball movement in the pass 18. It should be understood that if the load direction on the screw remains the same, but the direction of rotation of the screw is reversed, the balls within the pass 18 will continue to be the load carrying balls, but the direction of the ball movement with respect to the passes will be reversed. If, however, the load on the screw is in a direction opposite to that indicated in Figure 4, the balls within the pass 17 will assume the load carrying functions and the balls within the pass 18 will be free of any load and will therefore serve as the return circuit. It is apparent that a ball screw incorporating this invention can transmit loads in either direction when the screw is rotated and that the screw may be rotated either clockwise or counter-clockwise under either of these loading conditions.

Those skilled in the art will recognize that the ball screw according to this invention has the advantages of easy and straightforward methods of manufacture in both the nut and the screw and that the ball re-circulating insert 22 can accurately be produced by known machining, casting or forging methods. It is, however, preferable to use powdered metallurgy processes which would require no additional finishing of the part itself.

Figure 6:
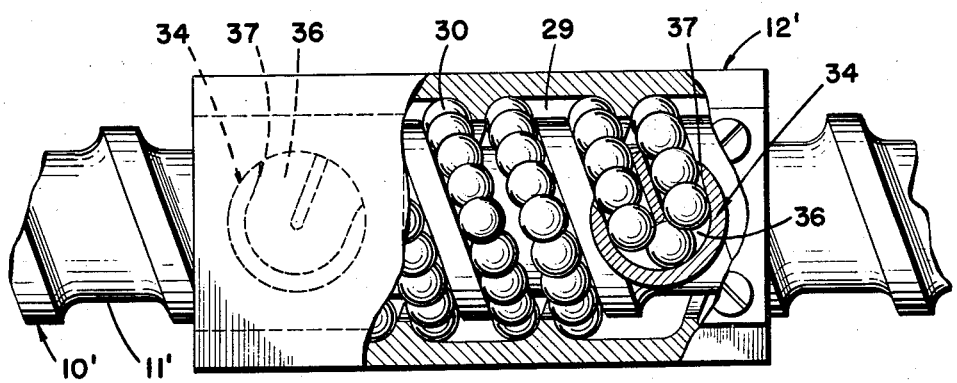
Figure 6 is a plan view partially in longitudinal section showing one modification of this invention.
Figure 7:
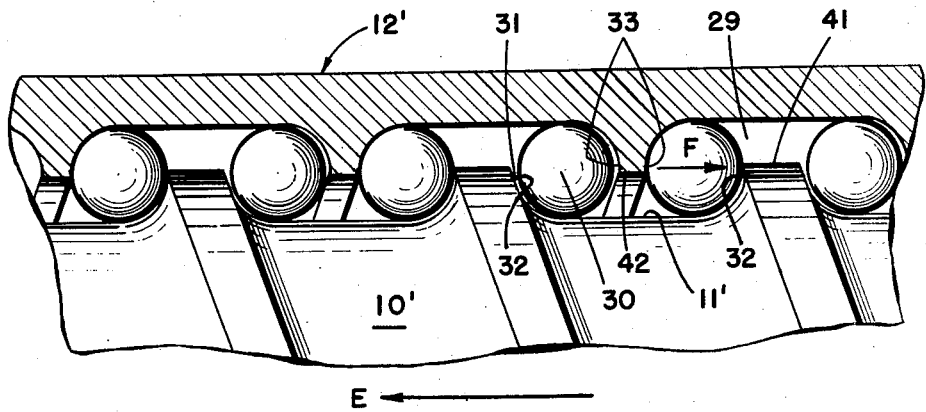
Figure 7 is an enlarged fragmentary section of the embodiment of Figure 6 showing the relationship between the two passes of balls.

In the embodiment of this invention shown in Figures 6 and 7, a nut 12' is formed with a single helical groove 29 which has a width substantially equal to the width of a groove 11' of a screw 10'. Here again, the clearance 31 is provided to insure that the balls within the return pass are loosely located and nonload bearing. In this particular case, side portion 32 of the groove 11' in the screw and side portion 33 of the groove 29 in the nut axially locate the balls within the return pass 30 when the screw is loaded with respect to the nut as shown by arrow E in Figure 7.

In this embodiment it is preferable to form the screw 10' and the nut 12' so that the ridges 41 and 42 each extend into the adjacent grooves to provide side portions 32 and 33 in alignment with diameters of the ball parallel to the axis of the screw. By utilizing this structure a device results wherein the both areas of engagement between the balls and the surfaces of the grooves 11' and 29 are equally spaced from the axis of the device. Therefore, the line of action F of the forces transmitted by the balls is substantially parallel to the axis of the nut and the screw so radial components of forces are virtually eliminated with the result that wear is decreased and the effective strength of the device is increased. This structure also provides a safety factor since the surfaces 32 and 33 would interfere and limit relative axial motion between the nut and the screw if for any reason the balls should escape from the ball passes.

A ball re-circulating insert 34 is formed with a groove 36 in a similar manner to the insert 22 and serves the same function; however, in this embodiment the ends of the groove 36 should be somewhat enlarged to compensate for the clearance 31 and to insure smooth flow of the balls into the groove 36. It is preferable, however, to form the grooves 36 so that the walls converge along an inclined portion 37 so that the position of the balls within the turning portion is accurately defined. The embodiment has the advantage of reduced manufacturing costs since a single groove is formed in the nut, thereby eliminating the multiple grooves of the embodiment shown in Figures 1 through 5.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A ball screw comprising a screw and a nut formed with helical grooves along the adjacent surfaces thereof, said grooves cooperating to define two helical passes adapted to receive antifriction members, a plurality of antifriction members in said passes interengaging said nut and screw whereby the members in at least one of said passes roll along the walls of said grooves when said nut and screw are rotated relative to each other, means connecting the ends of one pass to the ends of the other pass for transferring said members therebetween within the width of the groove of said screw, said means being proportioned to reverse the direction of flow of said members as they move from one pass to the other.

2. A ball screw comprising a screw formed with a helical groove along the periphery thereof, a nut formed with internal helical grooves, said grooves of said nut and screw cooperating to define two coaxial similar helical passes adapted to receive antifriction members, a plurality of antifriction members in said passes interengaging said nut and screw whereby the members in at least one of said passes roll along the walls of said grooves when said nut and screw are rotated relative to each other, means connecting the ends of one pass to the ends of the other pass for transferring said members therebetween, said means being proportioned to reverse the direction of flow of said members within the width of the groove of said screw as they move from one pass to the other.

3. A ball screw comprising a screw formed with a single helical groove along the periphery thereof, a nut formed with a single internal helical groove, said grooves cooperating to define two coaxial similar helical passes adapted to receive antifriction members, a plurality of antifriction members in said passes interengaging said nut and screw whereby the members in at least one of said passes roll along the walls of said grooves when said nut and screw are rotated relative to each other, means connecting the ends of one pass to the ends of the other pass within the width of one of said grooves for transferring said members therebetween, said means being proportioned to reverse the direction of flow of said members as they move from one pass to the other.

4. A ball screw comprising a screw and a nut formed with helical grooves in the surface thereof, said grooves cooperating to form two coaxial helical ball passes, balls in said passes, the balls in one of said passes interengaging the walls of the grooves in said screw and nut limiting relative axial motion therebetween in one direction and the balls in the other of said passes interengaging the walls of the grooves in said screw and nut limiting relative axial motion therebetween in the other direction, and means in each end of said nut connecitng the ends of said passes within the lateral limits of the groove of said screw and deflecting the balls therein through substantially a 180° turn.

5. A ball screw comprising a screw formed with a helical groove in the periphery thereof, a nut formed with two internal coaxial similar grooves therein, the lead of all of said grooves being equal, said screw groove being sufficiently wide to encompass both of said nut grooves, said grooves in said nut cooperating with said groove in said screw to form a pair of coaxial helical ball passes, balls in said passes, the balls in one of said passes being adapted to interengaging the walls of the groove in said screw and the walls of one of the grooves in said nut limiting relative axial motion therebetween in one direction and the balls in the other of said passes interengaging the walls of the groove in said screw and the walls of the other of the grooves in said nut limiting relative axial motion therebetween in the other direction, means in each end of said nut connecting the ends of said passes within the width of the groove of said screw and deflecting the balls therein through substantially a 180° turn.

6. A ball screw comprising a screw formed with a helical groove in the periphery thereof, a nut formed with two internal coaxial similar grooves therein, the lead of all of said grooves being equal, said screw groove being sufficiently wide to encompass both of said grooves in said nut, said grooves in said nut cooperating with said groove in said screw to form a pair of helical ball passes, balls in said passes, the balls in one of said passes being adapted to interengaging the walls of said groove in said screw and the walls of one of the grooves in said nut limiting relative axial motion therebetween in one direction and the balls in the other of said passes being adapted to interengaging the walls of the groove in said screw and the walls of one of the grooves in said nut limiting relative axial motion therebetween in the other direction, said balls and grooves being proportioned to provide clearance with the balls in one of said passes when the other of said passes is limiting axial motion between said nut and screw, and means in each end of said nut connecting the ends of said passes within the width of the groove of said screw and deflecting the balls therein through substantially a 180° turn.

7. A ball screw comprising a screw formed with a helical groove in the periphery thereof, a nut formed with two internal coaxial similar grooves therein, the lead of all of said grooves being equal, said screw groove being sufficiently wide to encompass both of said grooves in said nut, said grooves in said nut cooperating with said groove in said screw to form a pair of helical ball passes, balls in said passes, the balls in one of said passes interengaging said screw and nut limiting relative axial motion therebetween in one direction and the balls in the other of said passes interengaging said screw and nut limiting relative axial motion therebetween in the other direction, said balls and grooves being proportioned to provide clearance between one pass of balls and the associated grooves when the other of said passes is limiting axial motion between said nut and screw, and an insert mounted on each end of said nut formed with a U-shaped groove, one end of said U-shaped groove being aligned with each of said grooves in said nut, said U-shaped groove being proportioned to connect the ends of said passes and deflect the balls therein through substantially a 180° turn.

8. A ball screw comprising a screw and a nut member formed with helical grooves and ridges therebetween along adjacent surfaces thereof, said grooves cooperating to define two helical passes adapted to receive balls, a plurality of balls in said passes interengaging the surface of the grooves of said members whereby the balls in at least one of said passes roll along the walls of said grooves when said members are rotated relative to each other, the ridges between the grooves of one of said members extending radially into the area defined by the groove in the other of said members, and means connecting the ends of one pass to the ends of the other pass for transferring said balls therebetween within the width of one of said grooves.

9. A ball screw comprising a screw and a nut formed with helical grooves along adjacent surfaces thereof, said grooves cooperating to define two helical passes adapted to receive antifriction members, a plurality of antifriction members in said passes interengaging the surface of the grooves in said nut and screw whereby the members in at least one of said passes roll along the walls of said grooves when said nut and screw are rotated relative to each other, the area of engagement between the walls of the screw groove and said members and the area of engagement between the walls of the nut groove and said members being substantially equally spaced from the axis of the screw and nut, and means connecting the ends of one pass to the ends of the other pass for transferring said members therebetween within the width of one of said grooves.

References Cited in the file of this patent

UNITED STATES PATENTS

| | | |
|---|---|---|
| 782,347 | Lidback | Feb. 14, 1905 |
| 2,634,624 | Burt | Apr. 14, 1953 |

FOREIGN PATENTS

| | | |
|---|---|---|
| 129,196 | Great Britain | July 10, 1919 |